United States Patent

Yamamoto et al.

[15] 3,668,424

[45] June 6, 1972

[54] INVERTER CIRCUIT

[72] Inventors: Hirohiko Yamamoto; Masamichi Shiraishi, both of Tokyo, Japan

[73] Assignee: Nippon Electric Company, Limited, Tokyo, Japan

[22] Filed: Oct. 30, 1970

[21] Appl. No.: 85,673

[30] Foreign Application Priority Data

Nov. 1, 1969 Japan ..................................44/88260

[52] U.S. Cl. ..............................................307/214, 307/205
[51] Int. Cl. ......................................................H03k 19/40
[58] Field of Search ..................................307/205, 214, 221

[56] References Cited

UNITED STATES PATENTS

| | | | |
|---|---|---|---|
| 3,271,590 | 9/1966 | Sturman | 307/214 |
| 3,461,312 | 8/1969 | Farber et al. | 307/221 |

*Primary Examiner*—John Zazworsky
*Attorney*—Sandoe, Hopgood and Calimafde

[57] ABSTRACT

An inverter circuit comprising an input transistor, a load transistor, and a synchronizing transistor connected in series. A biasing voltage is applied to the load transistor, and a synchronizing signal is applied to the synchronizing transistor. The latter is effective to establish a relatively low resistance of the synchronizing transistor so that the load resistance and thus the switching speed of the circuit are substantially independent of the amplitude of the synchronizing pulse.

4 Claims, 10 Drawing Figures

Figure 1A:
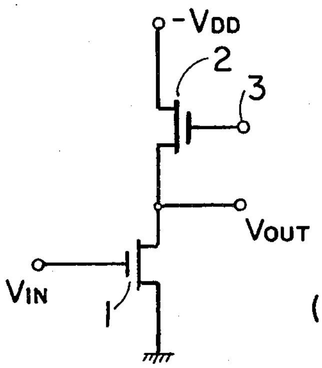

INVENTORS
HIROHIKO YAMAMOTO
MASAMICHI SHIRAISHI
by
Sandoe, Hopgood & Calimafde
ATTORNEYS

INVERTER CIRCUIT

This invention relates to an inverter circuit using an insulated gate field effect transistor. The inverter circuit may be employed in a memory circuit or in a dynamic shift register.

In a conventional inverter circuit of this type, such as those disclosed in U. S. Pat. Nos. 3,395,291 and 3,395,292, a periodic synchronizing pulse is applied to the gate of a load transistor whereby the duration of the conductive state of the load transistor, and thus the power consumption of the inverter circuit, is reduced.

According to these conventional devices, the resistance value of the load transistor is determined by the value of the synchronizing pulse, namely the voltage of the synchronizing pulse applied to the gate. Therefore, if the voltage of the synchronizing pulse is reduced for any reason, the resistance of the load transistor is increased and the switching speed of the inverter circuit is decreased. The amplitude of the synchronizing pulse may tend to vary, due to, for example, variations in the load impedance, or the amplitude of the synchronizing pulse may be subjected to significant variations, depending on the number of circuits to which the synchronizing pulse is applied. For this reason, the switching speed of the conventional inverter depends greatly on the number of such inverter circuits that are connected to the synchronizing pulse generator. Therefore, the inverter circuit must be redesigned for operation at the desired characteristics each time it is used in a different apparatus. This seriously affects the production efficiency when inverters of this type are manufactured on a mass production basis. Moreover, when the repetition frequency of the synchronizing pulse is raised, it is inevitably difficult to establish the amplitude of that pulse at a sufficiently high value. Accordingly, as noted above, the resistance value of the load transistor also increases and the switching speed of the inverter circuit becomes low.

It is an object of the invention to provide an inverter circuit which is stable in operation, free of variation in the amplitude of the synchronizing pulse, and easy to manufacture.

It is a specific object of the invention to provide an inverter circuit of the synchronized type whose switching speed and input-output characteristics are stable.

It is another object of the invention to provide a synchronized inverter circuit operable at a high switching speed.

A synchronized inverter circuit produced according to this invention comprises three insulated gate field effect transistors; a data input transistor, a load transistor, and a synchronizing transistor. The source of the input transistor is grounded, and the load transistor and the synchronizing transistor are connected in series to the drain of the input transistor. A DC voltage of a predetermined value is applied to the gate of the load transistor from a stabilized voltage source so that the resistance value of the load transistor is kept constant. The drain of the synchronizing transistor and the source of the data input transistor are connected to a DC voltage source, and a periodic synchronizing pulse is applied to the gate of the synchronizing transistor so that the resistance between the source and drain of the synchronizing transistor is made relatively low.

According to this invention, a synchronizing pulse having an amplitude that establishes a relatively low value of resistance between the source and drain of the synchronizing transistor is applied to the gate of the synchronizing transistor, and a DC voltage of a predetermined level is applied from the stabilized voltage source to the gate of the load transistor which functions as a load resistance. As a result, the value of the load resistance is kept constant irrespective of variations in the amplitude of the synchronizing pulse.

In a pulse generator, the amplitude of the synchronizing pulse is often varied by a load variation, but the power source voltage obtained from the stabilized voltage source can be kept constant despite a load variation. Therefore, according to this invention, if the preset amplitude of the synchronizing pulse is large enough to make the resistance of the synchronizing transistor sufficiently low, then even if the amplitude of the synchronizing pulse varies due to a variation in the load impedance, the load resistance is determined only by the constant voltage applied to the gate of the load transistor from the stabilized voltage source. In other words, it is possible in the inverter circuit of the invention to realize a synchronous inverter circuit having a consistently high switching speed and stable input-output characteristics, because the switching time is determined only by the function of the synchronizing transistor which has a sufficiently high voltage pulse applied at its gate. Furthermore, even if the repetition frequency of the synchronizing pulse increases thereby reducing its amplitude, the switching speed of the inverter is maintained high by the use of a sufficiently high voltage synchronizing pulse. Thus the inverter circuit of this invention is also readily operated in response to a synchronizing pulse having a high repetition frequency.

Figure 1B:
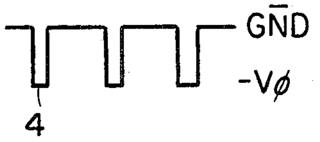
FIG. 1b (Prior Art)
Figure 2A:
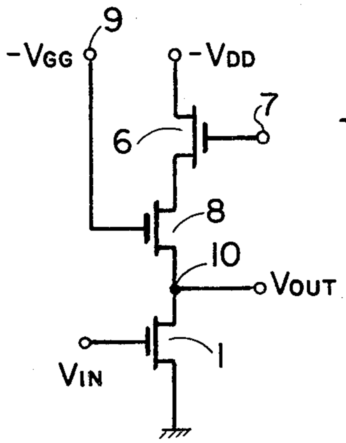
Figure 2B:
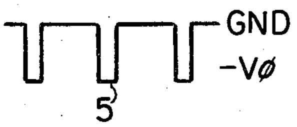
Figure 3:
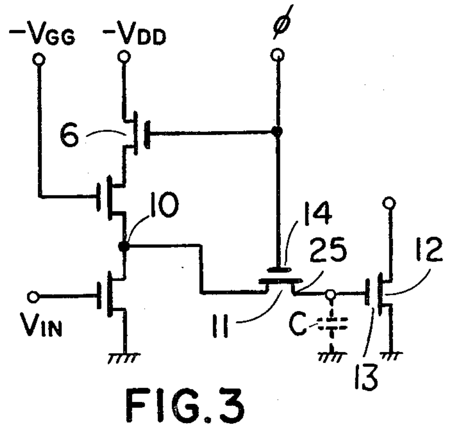
Figure 4A:
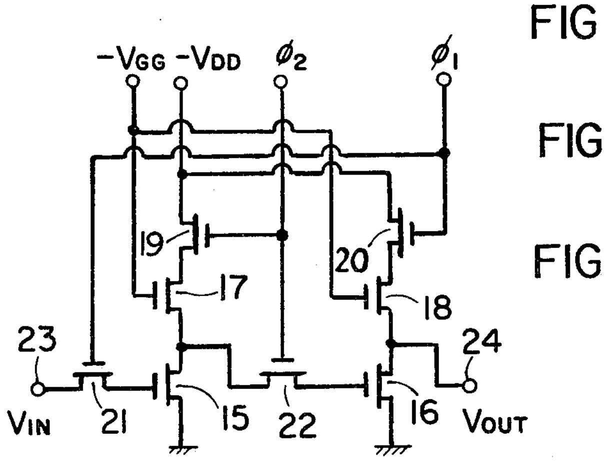
Figures 4B, 4C, 4D, 4E:
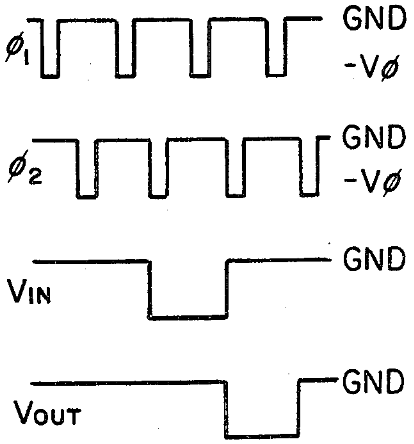

To the accomplishment of the above and to such further objects as may hereinafter appear, the present invention relates to an inverter circuit, substantially as defined in the appended claims and as described in the following specification taken together with the accompanying drawings in which:

FIG. 1*a* is a circuit diagram of a conventional synchronized inverter circuit;

FIG. 1*b* is a waveform diagram showing the synchronizing pulse applied to the gate of the synchronizing load transistor of the circuit in FIG. 1*a*;

FIG. 2*a* is a circuit diagram showing a synchronized inverter circuit embodying this invention;

FIG. 2*b* is a waveform diagram showing the synchronizing pulse applied to the gate of the synchronizing transistor of the inverter of FIG. 2*a*;

FIG. 3 is a circuit diagram showing a temporary memory circuit employing the synchronized inverter circuit of this invention;

FIG. 4*a* is a circuit diagram showing a dynamic shift register employing the synchronized inverter circuit of this invention;

FIGS. 4*b* and 4*c* are waveform diagrams respectively showing the first and second synchronizing pulses applied to the isolating transistor and synchronizing transistor of the shift register of FIG. 4*a*; and FIGS. 4*d* and 4*e* are diagrams showing the input and output waveforms of the shift register of FIG. 4*a*.

Referring now to FIGS. 1*a* and 1*b* showing a conventional synchronized inverter circuit, the source and drain of a data input transistor 1 and a synchronizing load transistor 2 of the insulated gate field effect type are connected in series to each other. The drain of the synchronizing load transistor 2 is connected to a DC source $-V_{DD}$, and the source of the data input transistor 1 is grounded. A periodic synchronizing pulse 4 having a negative voltage of amplitude $V_\phi$ is applied to the gate 3 of synchronizing load transistor 2. Pulse 4 causes transistor 2 to conduct and transistor 2 thus operates as a load resistance only for the duration of the applied synchronous pulse 4 to the gate 3 of that transistor. A data input signal $V_{IN}$ is applied to the gate of input transistor 1. In the inverter circuit of FIG. 1*a*, the value of the load resistance is determined by the amplitude (namely, the voltage level) of the synchronizing pulse 4. When the input signal $V_{IN}$ is negative, input transistor 1 is conductive and the output terminal $V_{OUT}$ is coupled essentially to ground through the source-drain circuit of transistor 1. On the other hand, when input signal $V_{IN}$ is positive or ground, transistor 1 is off and the output signal $V_{OUT}$ is coupled to the $-V_{DD}$ source through the load resistance of load transistor 2. The output signal $V_{OUT}$ at the output terminal is thus an inversion of the input signal $V_{IN}$ as is desired.

When synchronizing pulse 4 is applied to the circuit of FIG. 1*a* from a conventional pulse generator, the amplitude of synchronizing pulse 4 varies according to the load impedance applied. As a result, the load resistance of the inverter circuit tends to become higher than the specified value, and the switching speed of the circuit is lowered or its input-output characteristics are varied. In order to remove these drawbacks, it is necessary to modify the characteristics of the transistors used and to design the inverter circuit to meet each application of the circuit. For these reasons it has heretofore been difficult to manufacture universal type inverters on a mass production basis.

FIGS. 2*a* and 2*b* illustrate a synchronized inverter circuit according to this invention, which comprises a data input transistor 1 of the gate insulated field effect type, a load transistor 8 of the insulated gate field effect type, and a synchronizing transistor 6 also of the insulated gate field effect type. The source of the input transistor 1 is grounded, and the source-drain circuit of load transistor 8 is connected in series between the drain of the input transistor 1 and the source of the synchronizing transistor 6. A power source voltage $-V_{DD}$ of −24 volts is applied to the drain of the synchronizing transistor 6, an input signal $V_{IN}$ of −12 volts or −1 volt is applied to the gate of the input transistor 1, and an output signal $V_{OUT}$ of about −1 volt or about −15 volts is derived from the drain of the input transistor 1. A synchronizing pulse 5 having an amplitude voltage $-V_\phi$ of −24 volts, a pulse width of 2 $\mu$ sec., and a repetition frequency of 200 KHz is applied to the gate 7 of the synchronizing transistor 6. The output signal $V_{OUT}$ of the circuit of FIG. 2 is taken at point 10 defined at the junction of input transistor 1 and load transistor 8.

When the value of the resistance of the synchronizing transistor 6 in its conducting state is determined to be sufficiently smaller than that of the load resistance necessary to operate the inverter circuit, it is possible to operate the circuit substantially independent of variations in the amplitude of the synchronizing pulse 5. For the purpose of making the resistance of the synchronizing transistor 6 smaller than the load transistor 8, the amplitude of the synchronizing pulse 5 is controlled, as mentioned before. In addition, it is preferable for this purpose to use a synchronizing transistor 6 in which the ratio of the width to the length of a channel between the source and drain regions is made larger than that of the load transistor 8. In this embodiment of the invention, the resistance of the synchronizing transistor 6 in the conducting state may be made to be 30 KΩ, while that of the load transistor 8 may be 200 KΩ. Furthermore, when a constant DC voltage $-V_{GG}$ is applied to the gate of the load transistor 8 so that the resistance between the source and drain of the load transistor 8 is kept at a certain value, for example 200 KΩ in this case, then the load resistance of the circuit can be determined regardless of the amplitude of the synchronizing pulse 5.

Thus according to this invention, the switching speed and input-output characteristics of the inverter circuit are stable and independent of variations in the amplitude of the synchronizing pulse. Furthermore, when the repetition frequency of the synchronous pulse is increased, the amplitude of the synchronizing pulse is lowered. For example, a synchronizing pulse of −24 volts having a triangular shape and a 2 $\mu$sec. pulse width, is decreased to −18 volts at a pulse width of 15 $\mu$sec., and to −12 volts at a pulse width of 1 $\mu$sec. Even when the amplitude of the synchronizing pulse is reduced upon an increase in the repetition rate of that pulse, the switching speed of this circuit is not reduced. As a result, it becomes possible to operate the inverter circuit of the invention with synchronizing pulses at a high repetition rate. In addition, the inverter circuit of this invention is operable substantially independent of variations in the load of the synchronizing pulse and thus a universal, mass-producible inverter circuit may be realized.

FIG. 3 schematically illustrates a temporary memory circuit using the synchronized inverter circuit of this invention. In the circuit of FIG. 3, the output terminal 10 of the inverter circuit as in FIG. 2*a* is connected to the gate 13 of a second data input transistor 12 serially through the source-drain circuit of an isolating transistor 11. A synchronizing pulse applied to the gate 7 of the synchronizing transistor 6 is also applied to the gate 14 of the isolating transistor 11. The output signal of the inverter is temporarily stored in the static capacity C established between the source 25 of the isolating transistor 11 and the gate 13 of the second data input transistor 12 until the next synchronizing pulse is applied.

FIG. 4*a* schematically illustrates a dynamic shift register using the inverter circuit of this invention. This circuit is a two-stage cascade of the temporary memory circuit illustrated in FIG. 3. This shift register comprises first and second data input transistors 15 and 16, first and second load transistors 17 and 18, first and second synchronizing transistors 19 and 20, and first and second isolating transistors 21 and 22. The first synchronizing pulse $\phi_1$ having an amplitude voltage $-V_\phi$ is applied to the gates of the first isolating transistor 21 and of the second synchronizing transistor 20. The second synchronizing pulse $\phi_2$, having an amplitude voltage $-V_\phi$, which as shown in FIGS. 4*b* and 4*c* does not overlap the first synchronizing pulse $\phi_1$, is applied to the gates of the first synchronizing transistor 19 and of the second isolating transistor 22, and a DC voltage $-V_{GG}$ is applied to the gates of the first and second load transistors 17 and 18 from a stabilized voltage source. An output signal $V_{OUT}$ (FIG. 4*e*) is derived at an output terminal 24 from the data input signal $V_{IN}$ (FIG. 4*d*) applied to the data input terminal 23 which is in turn connected to the drain of the first isolating transistor 21. This output signal derived at the data output terminal 24 is delayed by one cycle with respect to the synchronizing pulse as shown in FIGS. 4*d* and 4*e*.

As has been described by referring to FIGS. 2, 3, and 4*a*, the inverter circuit of this invention can be operated stably without being influenced by variations in the amplitude of the synchronizing pulse, and thus this inverter circuit can be used widely for various electronic apparatus and devices.

In the above description, an insulated gate field effect transistor is used as the active element of the circuits shown in FIGS. 2 and 3. Instead, other suitable active or passive elements may be used. However, for the purpose of increasing the integration density of an integrated circuit containing many inverter circuits, use of the insulated gate field effect transistor is best suited. It may seem reasonable to utilize a buried type resistance element as the load element. In the buried type resistance element, however, a large area is required to obtain a high resistance, and its resistance value is inevitably unchanged. In other words, the universality of a device including an inverter circuit of this type is lowered. When the insulated gate field effect transistor is used as the load element, a small area is sufficient to obtain a large resistance, and the resistance can be arbitrarily controlled by the electric field applied to the gate electrode. In short, the inverter circuit of this invention is highly practical in many ways where high integration density, universality, and mass-productivity are important factors.

While one specific synchronized inverter circuit of the invention has been described in detail, it is particularly understood that the invention is not limited thereto or thereby. For example, it is apparent to one skilled in this art that the serially connected load transistor 8 and synchronizing transistor 6 may be interchanged. In other words, in a circuit of FIG. 2, the terminal 9 may be used as a terminal for the synchronizing pulse $V_\phi$, and the terminal 7 may be used as a terminal for the constant DC voltage $V_{GG}$.

Thus while only a single embodiment of the present invention has been herein specifically described, it will be apparent that modifications may be made therein without departing from the spirit and scope of the invention.

We claim:

1. A synchronized type inverter circuit comprising first, second, and third insulated gate field effect transistors each having source, gate, and drain electrodes, the source electrode of said first transistor being grounded, the drain electrode of said first transistor being connected to the source electrode of said second transistor, the drain electrode of said second transistor being connected to the source electrode of said third transistor; means for applying a DC voltage to the drain electrode of said third transistor; means for supplying an input signal to the gate electrode of said first transistor; means for deriving an output signal from the drain electrode of said first transistor; means for applying a DC bias signal to the gate electrode of one of said second and third transistors; and means for supplying a periodic synchronizing signal to the gate electrode of the other of said second and third transistors, the resistance of said other transistor when in the conducting state being established at a relatively low value.

2. The inverter circuit as claimed in claim 1, wherein said one and other transistors are said second and third transistors, respectively.

3. The inverter circuit as claimed in claim 1, wherein said one and other transistors are said third and second transistors, respectively.

4. The inverter circuit of claim 1, in which said bias signal is effective to establish a substantially constant resistance between the source and drain of said one transistor at a value higher than the resistance of said other transistor and substantially independent of the amplitude of said synchronizing signal.

* * * * *